US011528215B2

(12) United States Patent
Davey et al.

(10) Patent No.: US 11,528,215 B2
(45) Date of Patent: Dec. 13, 2022

(54) CONVERGENCE FUNCTION TO AVOID MICRO-LOOPS

(71) Applicant: MICROSOFT TECHNOLOGY LICENSING, LLC, Redmond, WA (US)

(72) Inventors: Alan Keith Davey, Welwyn Garden City (GB); Thomas David Jinks, Enfield (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 55 days.

(21) Appl. No.: 17/233,409

(22) Filed: Apr. 16, 2021

(65) Prior Publication Data

US 2022/0337507 A1      Oct. 20, 2022

(51) Int. Cl.
*H04L 45/023*       (2022.01)
*H04L 45/121*       (2022.01)
(Continued)

(52) U.S. Cl.
CPC ........ *H04L 45/023* (2013.01); *H04L 41/0816* (2013.01); *H04L 41/12* (2013.01);
(Continued)

(58) Field of Classification Search
CPC ... H04L 45/023; H04L 41/0816; H04L 41/12; H04L 45/121; H04L 45/123; H04L 45/18
See application file for complete search history.

(56) References Cited

U.S. PATENT DOCUMENTS 9,838,246 B1 * 12/2017 Hegde ................... H04L 45/18
9,876,705 B1 *  1/2018 Poutievski ............ H04L 49/35
(Continued)

FOREIGN PATENT DOCUMENTS

KR     102123689 B1 *  1/2019  .......... H04L 12/705
WO    2005039109 A1      4/2005

OTHER PUBLICATIONS

Litkowski, et al., "Micro-loop prevention by introducing a local convergence delay", Retrieved from: https://tools.ietf.org/id/draft-ietf-rtgwg-uloop-delay-09.html, Nov. 12, 2017, 19 Pages.
(Continued)

*Primary Examiner* — Mounir Moutaouakil
(74) *Attorney, Agent, or Firm* — Newport IP, LLC; Han K. Gim

(57) ABSTRACT

The techniques disclosed herein enable systems to perform ordered reconvergence operations following a change to a topology of a communications network. To perform ordered reconvergence, a system detects a change to network topology such as a link failure or node addition. In response, the system determines a global delay based on a maximum distance between two nodes within the network, a local delay for each node within the network, and an ordered delay for each node based on the global delay and the local delay. Upon detecting that the ordered delay for a node has elapsed, the system can then update a routing table for the node. After updating routing tables for every node, the system can route data in the changed network topology using the updated routing tables.

20 Claims, 17 Drawing Sheets

(51) Int. Cl.
  *H04L 45/18* (2022.01)
  *H04L 41/12* (2022.01)
  *H04L 41/0816* (2022.01)
  *H04L 45/12* (2022.01)

(52) U.S. Cl.
  CPC .......... *H04L 45/121* (2013.01); *H04L 45/123* (2013.01); *H04L 45/18* (2013.01)

(56) References Cited

U.S. PATENT DOCUMENTS

| | | |
|---|---|---|
| 2005/0276216 A1 | 12/2005 | Vasseur et al. |
| 2016/0164770 A1* | 6/2016 | Liu .......................... H04L 45/12 370/254 |
| 2018/0359175 A1* | 12/2018 | Decraene ................ H04L 45/18 |
| 2021/0399974 A1* | 12/2021 | Sikhivahan ........... H04L 45/122 |

OTHER PUBLICATIONS

Shand, et al., "A Framework for Loop-Free Convergence", Retrieved from: https://tools.ietf.org/html/rfc5715#:~:text=Informational%20%5BPage%2013%5D-,RFC%205715%20A%20Framework%20for%20Loop%2DFree%20Convergence%20January%202010,no%20further%20computation%20is%20needed, Jan. 2010, pp. 1-22.

Shand, et al., "Framework for Loop-Free Convergence Using the Ordered Forwarding Information Base (oFIB) Approach", Retrieved from: https://tools.ietf.org/html/rfc6976, Jul. 2013, pp. 1-28.

"International Search Report and Written Opinion Issued in PCT Application No. PCT/US22/022416", dated Jun. 22, 2022, 18 Pages.

* cited by examiner

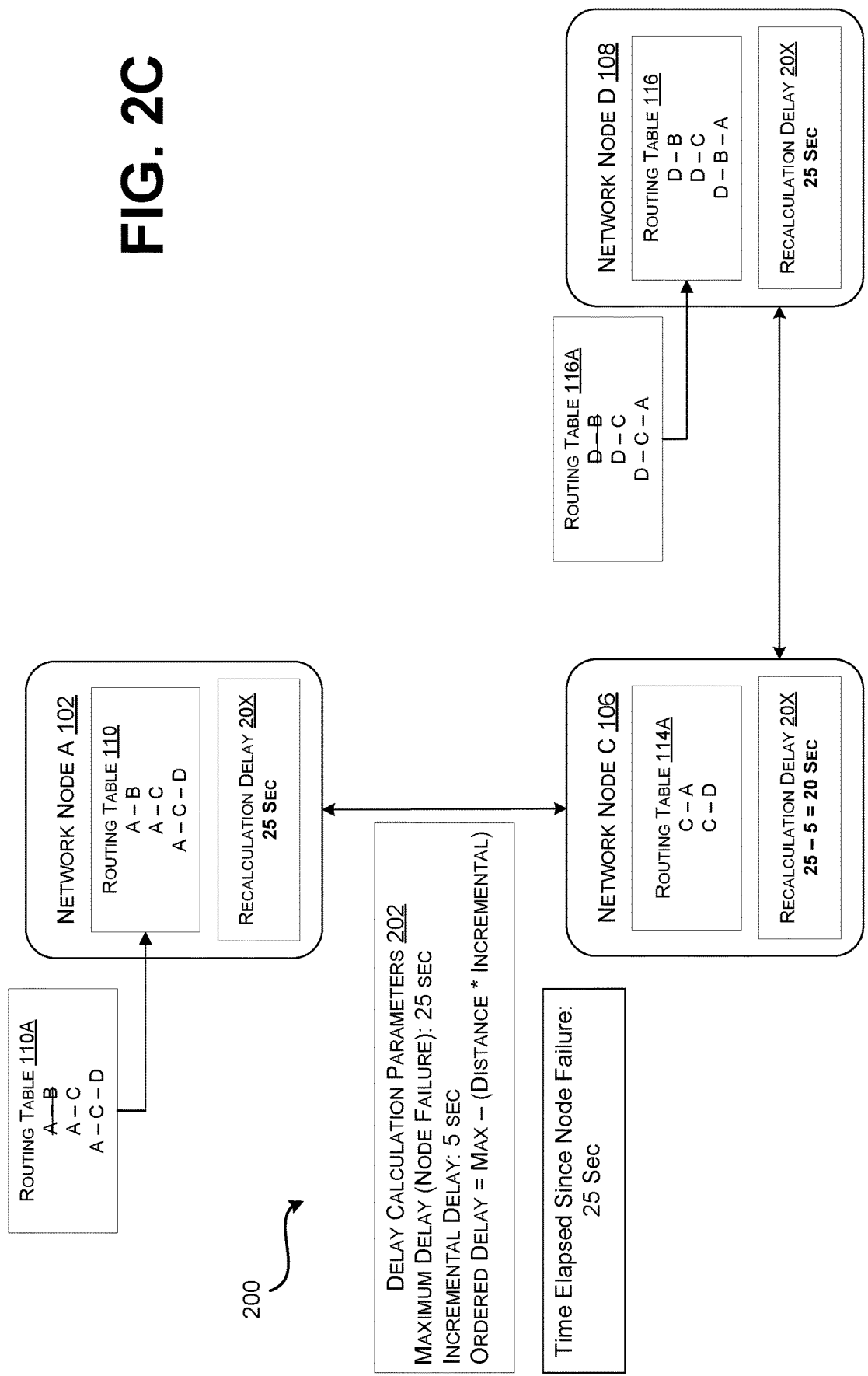

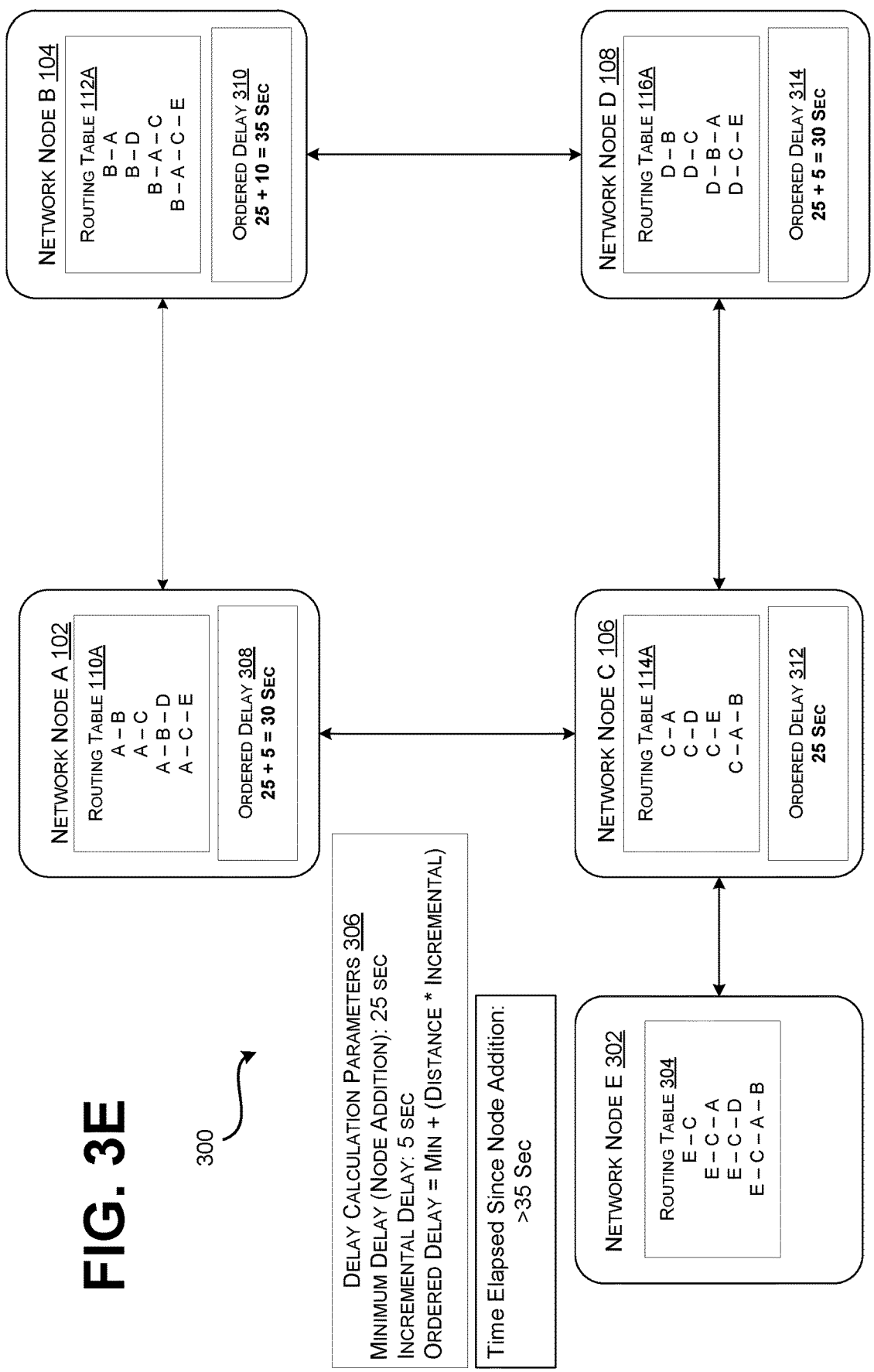

CONVERGENCE FUNCTION TO AVOID MICRO-LOOPS

BACKGROUND

With the rapidly increasing popularity of network-based services such as cloud computing for data storage, real-time collaboration, and streaming services, more and more data and/or services are stored and/or provided online via network connections. Providing an optimal and reliable user experience is a vital aspect for platform providers that offer network-based services. In many scenarios, a cloud-based platform may provide a service to thousands or millions of users (e.g., customers, clients, tenants, etc.) geographically dispersed around a country, or even the world. In order to provide this service, a cloud-based platform often includes different resources, such as server farms, hosted in various datacenters. In addition, the service can be constructed of various software components.

These network-based services can be provided by complex communications networks that contain the various datacenters that host server farms including physical and/or virtual resources for routing data in the network. Individual entities that route data within the network (e.g., ethernet hubs, routers) may also be referred to as nodes. Each node within the network can route data to other nodes through a map of the network topology often referred to as a routing table. Routing tables can be generated upon initialization of the network and modified by each node in response to changes to the network topology.

In the operation of these communications networks, it is commonplace for the network topology to change over time. For instance, network topology can change as a result of a link failure between individual nodes or even a failure of the nodes themselves causing portions of the network to go offline. Conversely, network topology can change due to the addition of new nodes to the network and corresponding new links. Thus, to prevent data loss and ensure a stable user experience, it is necessary for each node within the network to recalculate its associated routing table when changes to the network topology occur, this is often referred to as reconvergence.

SUMMARY

In practical applications, reconvergence within a communications network is not instantaneous and constituent nodes may arbitrarily recalculate their individual routing tables with no defined order. Thus, as will be elaborated further below, a first node, having already reconverged, can route data to a second node that has not yet reconverged. Thus, the second node, which is referring to an outdated routing table, may transmit the data back to the first node in what is typically referred to as a micro-loop. While all nodes will eventually reconverge thereby eliminating the micro-loop, this period of looping can result in an unacceptable level of latency or data loss.

While there are existing solutions for mitigating the occurrence of micro-loops, these solutions are hampered by tradeoffs between computational efficiency and efficacy in preventing micro-loops. For instance, an existing solution can include a local recalculation delay for nodes near a link failure to allow other nodes within the network to recalculate their routing tables first. However, such solutions, while computationally simple, may not effectively prevent micro-loops throughout the network. Conversely, another solution may include mechanisms for calculating paths through the network from each node to the failure and ranking individual nodes to recalculate routing tables in an ordered fashion. These solutions, while effective in preventing micro-loops, are computationally expensive and complex resulting in extended processing times. Furthermore, some existing solutions do not consider all changes that modify the network topology (e.g., link failures vs. node failures). Thus, there is a need for communications networks to efficiently and effectively mitigate the occurrence of micro-loops in diverse situations.

The disclosed techniques improve the efficiency and functionality of communications networks by enabling micro-loop prevention through ordered reconvergence using existing route calculations to generate ordered delays for individual nodes. Generally described, individual nodes and a network protocol (e.g., an interior gateway protocol (IGP)) coordinate to perform reconvergence operations following a modification to the network topology. For example, a failure may occur in the communications network causing a change to the network topology such as a link failure between two nodes. Upon detecting the change in network topology, an ordered delay can be determined for each node of the network. The ordered delay can be calculated using a global delay, an incremental delay, and a distance between a particular node and the topology modification. Distance within a communications network can typically be referred to in terms of hops. That is, the distance between two nodes is the number of intervening nodes, or hops, that must be traversed. The global delay and incremental delay can be determined by an entity that administers the communications network such as a system engineer.

Each node of the network can then, upon the completion of their associated ordered delay, recalculate their routing table to reflect the new network topology. In this way, the nodes can reconverge in a well-defined and ordered manner to effectively prevent the formation of micro-loops. In addition, the system can utilize existing distances calculations from the IGP for determining ordered delays. Thus, the system can enable ordered reconvergence features without the complex computational operations of some existing solutions.

By utilizing calculating ordered delays for each node within a network to enable ordered reconvergence, a system can effectively prevent micro-loop formation and associated data loss. In addition, by using existing distances determined by the IGP to calculate ordered delays, the system can reap the benefits of ordered reconvergence without incurring the computing cost of existing ordered reconvergence solutions. Consequently, by reducing complexity of the micro-loop mitigation solution, processing time is significantly reduced following a topology change allowing a network to more quickly return to a steady operating state compared to existing solutions. The disclosed techniques thus improve performance by saving computing resources, such as processing cycles, memory resources, and networking resources, by leveraging existing data to calculate ordered delays rather than relying upon additional calculations to generate ordered delays.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 2C illustrates aspects of a second example network environment in a third state of a process of ordered reconvergence.

FIG. 3E illustrates aspects of a third example network environment in a fifth state of a process of ordered reconvergence.

DETAILED DESCRIPTION

Figure 1A:
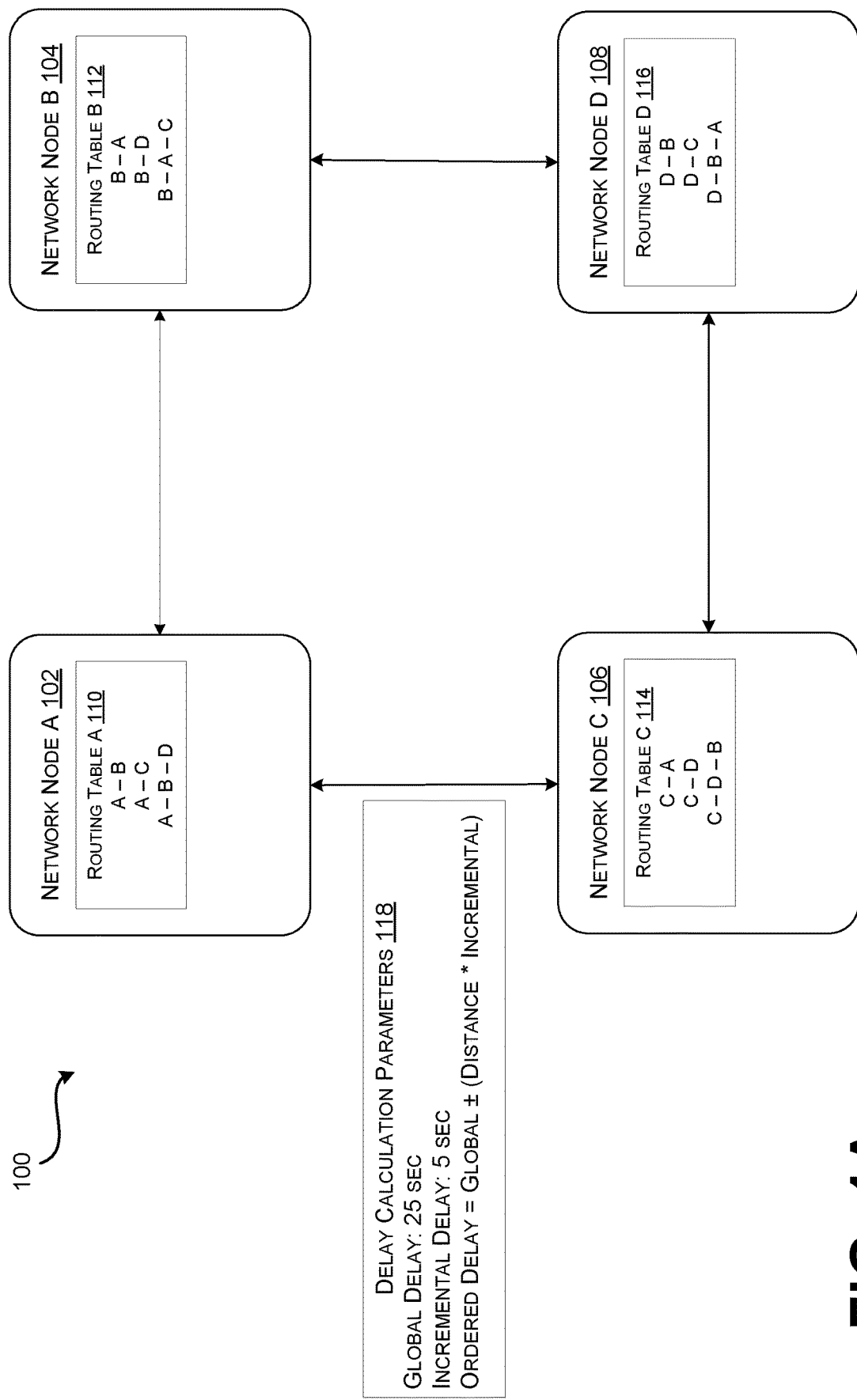
FIG. 1A illustrates an example network environment utilizing ordered reconvergence features.

The techniques disclosed herein provide systems for optimizing the use of computing resources and to improve the operation of communications networks by the introduction of ordered reconvergence features. The techniques disclosed herein utilize existing distance values calculated by an interior gateway protocol (IGP) to generate ordered delays thereby enabling nodes of the network to reconverge in a well-defined fashion following a change in network topology. A node can include physical and/or virtual resources for routing data within a communications network such as an ethernet hub or a modem. In one example, the communications network can provide cloud-based applications that enable access to internal sites, documents, lists, libraries and the like from diverse user devices. A change in network topology can include link failures, node failure, node additions, and link additions.

The disclosed techniques address several problems associated with micro loop prevention solutions. For example, existing solutions often rely upon performing complex calculations to enable ordered reconvergence. Such techniques can result in long processing times following a change in network topology leading to data loss and ultimately a degraded user experience. As described in more detail below, the disclosed techniques can also improve performance of communications networks by more efficiently and effectively preventing micro-loops. By calculating ordered delays using readily available data, the disclosed techniques can save computing resources, such as processing cycles, memory resources, and networking resources.

Traditional approaches to micro-loop prevention are oftentimes hampered by compromises between effective micro-loop prevention and computational complexity. For instance, existing approaches that enable ordered reconvergence typically rely upon performing additional operations to calculate distances within the network and assign ordered delays to individual nodes. This results in added complexity to the system leading to extended processing times as well as additional points of failure within the system. Stated another way, existing solutions that utilize ordered reconvergence features require additional implementation of complex calculations. This added complexity can lead to further failures within the network and introduce new inefficiencies to the system. Furthermore, existing solutions may lack functionality to address the full diversity of network topology modifications. For instance, some solutions may only address link failures and not node failures or node additions.

In contrast, the disclosed techniques utilize readily available distance values previously calculate by an IGP to assign ordered delays to individual nodes following a modification to network topology. In this way, the disclosed techniques enable communications networks to utilize ordered reconvergence to prevent micro-loops without the added complexity and risks of existing solutions.

To illustrate aspects of the present disclosure, consider an example scenario involving a communications network operated by a financial institution. In this example, the network is responsible for transmitting data in support of critical financial applications. During regular operation of the network, a link failure may occur between two nodes causing a temporary change to the network topology. Due to the sensitive and urgent nature of some financial applications, it is vital for the network to quickly detect and adapt to the link failure in order to minimize or entirely eliminate data loss. Furthermore, micro-loops, even given their transience within the network, can cause unacceptable data loss and impact important functions within the organization. In addition, service disruptions in such contexts must be resolved quickly to return the network to a maximally performant steady state. By employing the ordered reconvergence techniques described herein together with a fast reroute mechanism to address urgent topology changes, the network can effectively prevent micro-loops throughout the network and minimize data loss. In addition, the network can benefit from the increased computational efficiency of the disclosed techniques to reduce processing time when reconverging. In this way, the financial applications provided by the communications network can quickly restore performance further minimizing disruptions to service.

In another example of a technical effect of the present disclosure, the ordered reconvergence features described herein improve the performance of communications networks. This is possible due to the efficacy of the disclosed ordered reconvergence techniques in preventing micro-loops throughout a particular network while incurring minimal computational cost leading to reduced processing times compared to traditional solutions. Thus, networks utilizing the disclosed techniques can quickly address changes to network topology and return to a maximally performant state in less time. In this way, communications networks can reduce disruptions to service and minimize data loss leading to an improved user experience.

Various examples, scenarios, and aspects that enable ordered reconvergence using existing distance values are described below with reference to FIGS. 1-6.

FIG. 1A illustrates an example communications network environment 100 containing a first communication node A 102, a second communication node B 104, a third communication node C 106, and a fourth communication node D 108. In addition, each node is configured with an associated routing table A-D 110-116. Each routing table contains data defining paths with which a node can route data from itself to other nodes within the network. It should be understood that the routing tables can be populated through any method such as static routing or dynamic routing. Furthermore, the routing tables can be modified automatically by the nodes themselves or manually such as by a system engineer.

In accordance with aspects of the disclosed techniques, the network 100 can be configured with delay calculation parameters 118 for assigning ordered delays to the nodes 102-108 when performing reconvergence following a change to the network topology as discussed above. The parameters can include a global delay (e.g., a maximum delay or minimum delay) and an incremental delay which the system can use to calculate individual ordered delays. It should be understood that the global delay can be determined automatically by the system based on various factors such as a maximum distance between two nodes. Similarly, the incremental delay can be determined automatically based on analysis of the network by the system to minimize processing time when reconverging. Alternatively, the global delay and incremental delay can be manually configured by a system administrator or system engineer. Furthermore, various delay values can be determined to suit certain situations. For instance, the maximum delay in this example is specific to a link failure. Other values may be specific to other events such as node failures or node additions.

The delay calculation parameters 118 can also include an equation for calculating ordered delays for individual nodes. Ordered delays can be calculated based on the global delay and a product of the distance from a particular node to the topology change and the incremental delay. It should be understood that while the examples presented herein use the illustrated equation to calculate ordered delays, ordered delays can be calculated in many ways using the described factors. For instance, ordered delays can be determined using a statistical model modified by the distance values for individual nodes.

Figure 1B:
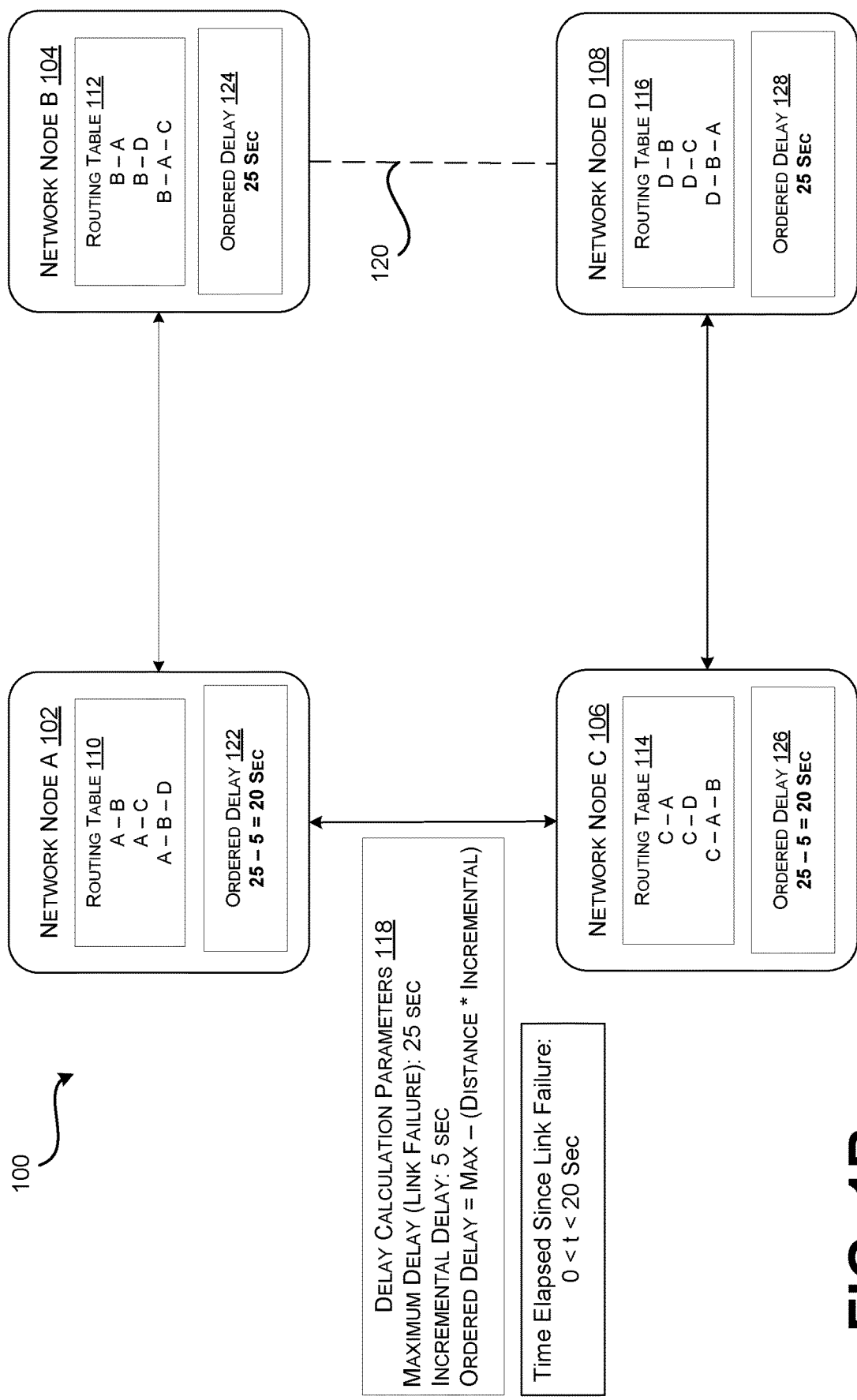
FIG. 1B illustrates aspects of an example network environment in a first state of a process of ordered reconvergence.

Turning now to FIG. 1B, a link failure 120 has occurred between network node B 104 and network node D 108. In response, each network node 102-108 calculates an ordered delay using the values and equations defined in the delay calculation parameters 118. In the case of a link failure, nodes near the failure (e.g., node B 104, and node D 108) wait a maximum time to allow other nodes (e.g., node A 102, and node C 106) to update their respective routing tables. By updating routing tables in this way, the system can effectively prevent micro-loops.

In this example, the ordered delays are calculated using the following equation:

$$OrderedDelay = MaxDelay - (Distance * IncrementalDelay)$$

In the above equation, MaxDelay and IncrementalDelay are defined in the delay calculation parameters 118 and Distance is the distance from a particular node to the link failure expressed as a number of hops. As described above, distance values can be measured by a network protocol (e.g., an interior gateway protocol) at an earlier point in the network operation. For instance, when initially populating the routing tables 110-116, measured distance values can be persistently stored for use in calculating ordered delays. In this way, the system can quickly calculate ordered delays without performing additional computation to measure distances within the communications network. In addition, the value of (Distance*IncrementalDelay) can be referred to as a local delay, thus ordered delay can be expressed as:

$$OrderedDelay = MaxDelay - LocalDelay$$

For example, node A 102 is assigned an ordered delay 122 of twenty seconds. This is determined by subtracting the incremental delay (five seconds) multiplied by the distance from node A to the link failure (one hop) from the maximum delay (twenty-five seconds). Similarly, node C 106 determines a twenty second ordered delay since it is also one hop from the link failure 120. The same operation occurs at each node of the network to assign additional ordered delay 124-128. As discussed above, the maximum delay and incremental delay can be configured automatically by the network or predetermined by a system administrator or engineer. In addition, it should be understood that the maximum delay and incremental delay shown in FIG. 1B are merely illustrative and that delay values can be set to suit the conditions and needs of various networks regardless of the number of constituent nodes.

Figure 1C:
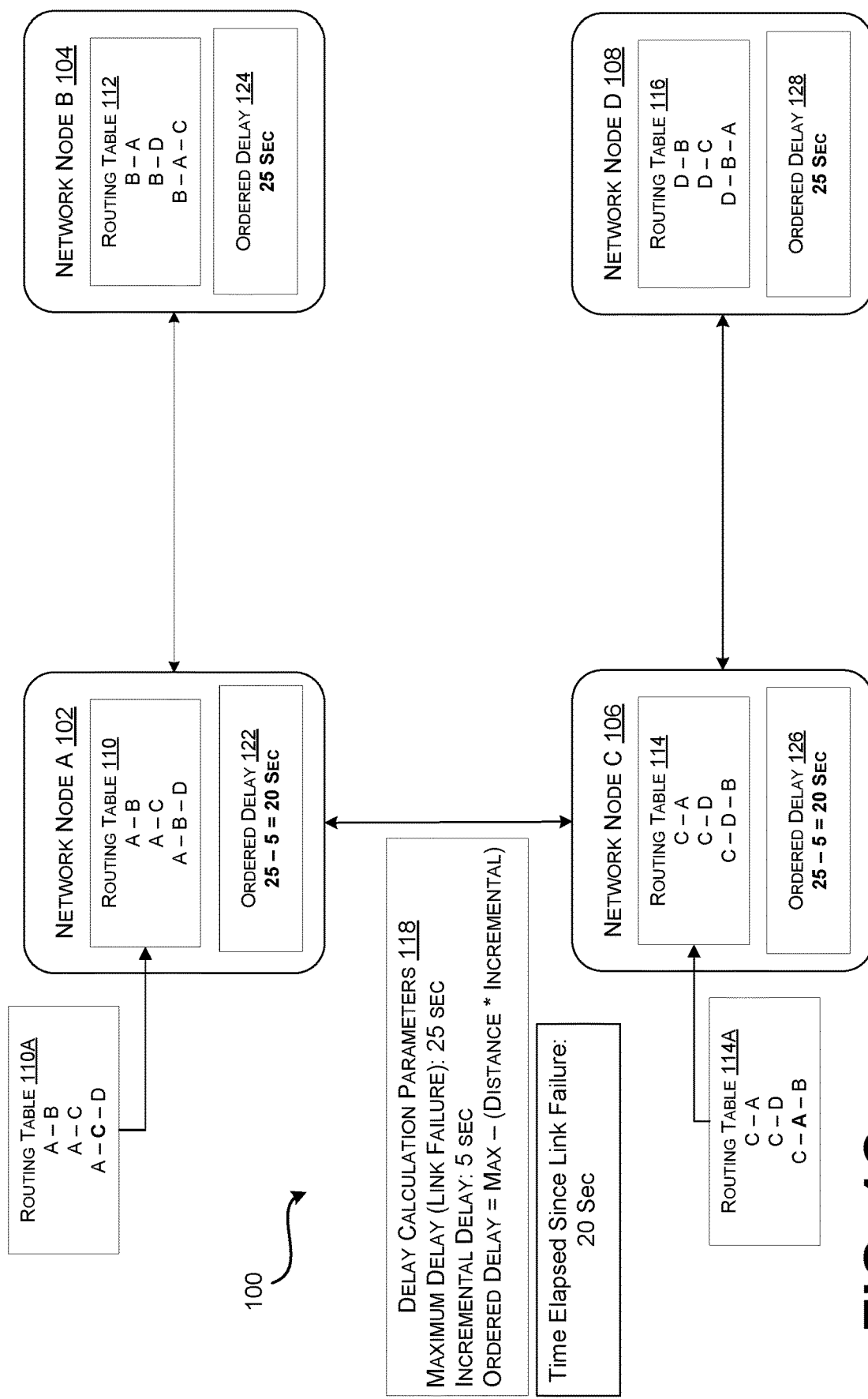
FIG. 1C illustrates aspects of an example network environment in a second state of a process of ordered reconvergence.

Turning now to FIG. 1C, twenty seconds has elapsed since the link failure 120 shown in FIG. 1B. As such, network node A 102 can detect that its respective ordered delay 122 has elapsed and can thus update their associated routing tables. In this example, node A 102 can detect that route A-B-D in routing table 110 is no longer feasible since the link between node B 104 and node D 108 has failed. Node A can then replace routing table 110 with an updated routing table 110A that now routes data through node C 106 to reach node D 108. Similarly, node C 106 can detect that its ordered delay 126 has elapsed and replace its routing table 114 with an updated routing table 114A. Consequently, node C 106 no longer routes data through node D 108 to reach node B 104 in response to the link failure 120.

Figure 1D:
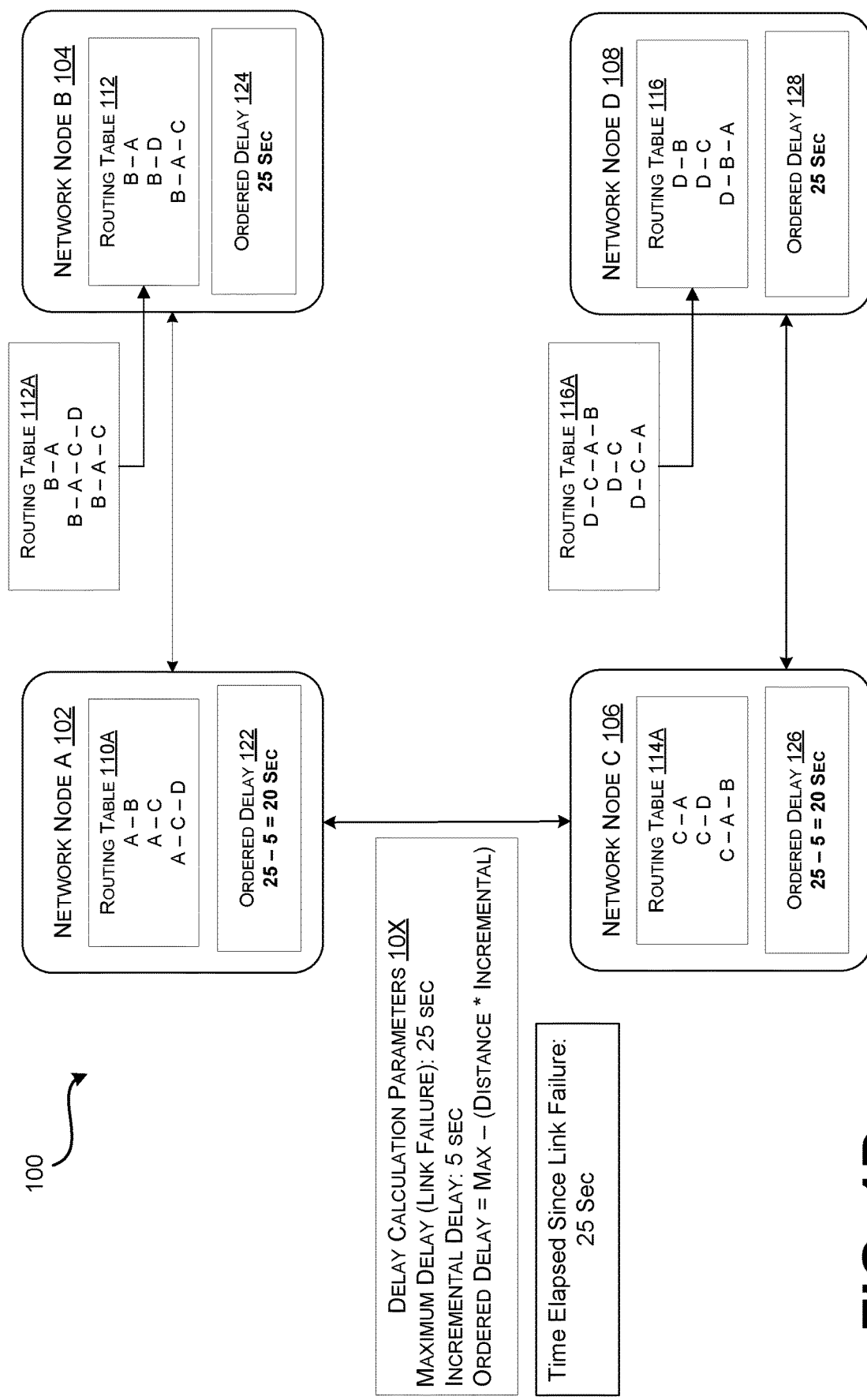
FIG. 1D illustrates aspects of an example network environment in a third state of a process of ordered reconvergence.

Proceeding to FIG. 1D, twenty-five seconds has now elapsed since link failure 120 occurred. At this point, node B 104 and node D 108 can detect that their respective ordered delays 124 and 128 have elapsed. As discussed above, since node B 104 and node D 108 are the nearest nodes to the link failure 120. This is to allow more distant nodes (e.g., node A and node C) to update routing tables first and thus prevent micro-loops from occurring. Accordingly, node B 104 and node D 108 can now update their routing tables 112 and 116 respectively. As shown in routing table 112A, node B 104 must now route data through node A 102 and node C 106 to reach node D 108. Due to the well-defined and ordered fashion in which the nodes reconverged, no micro-loops were formed and no data was lost.

Figure 1E:
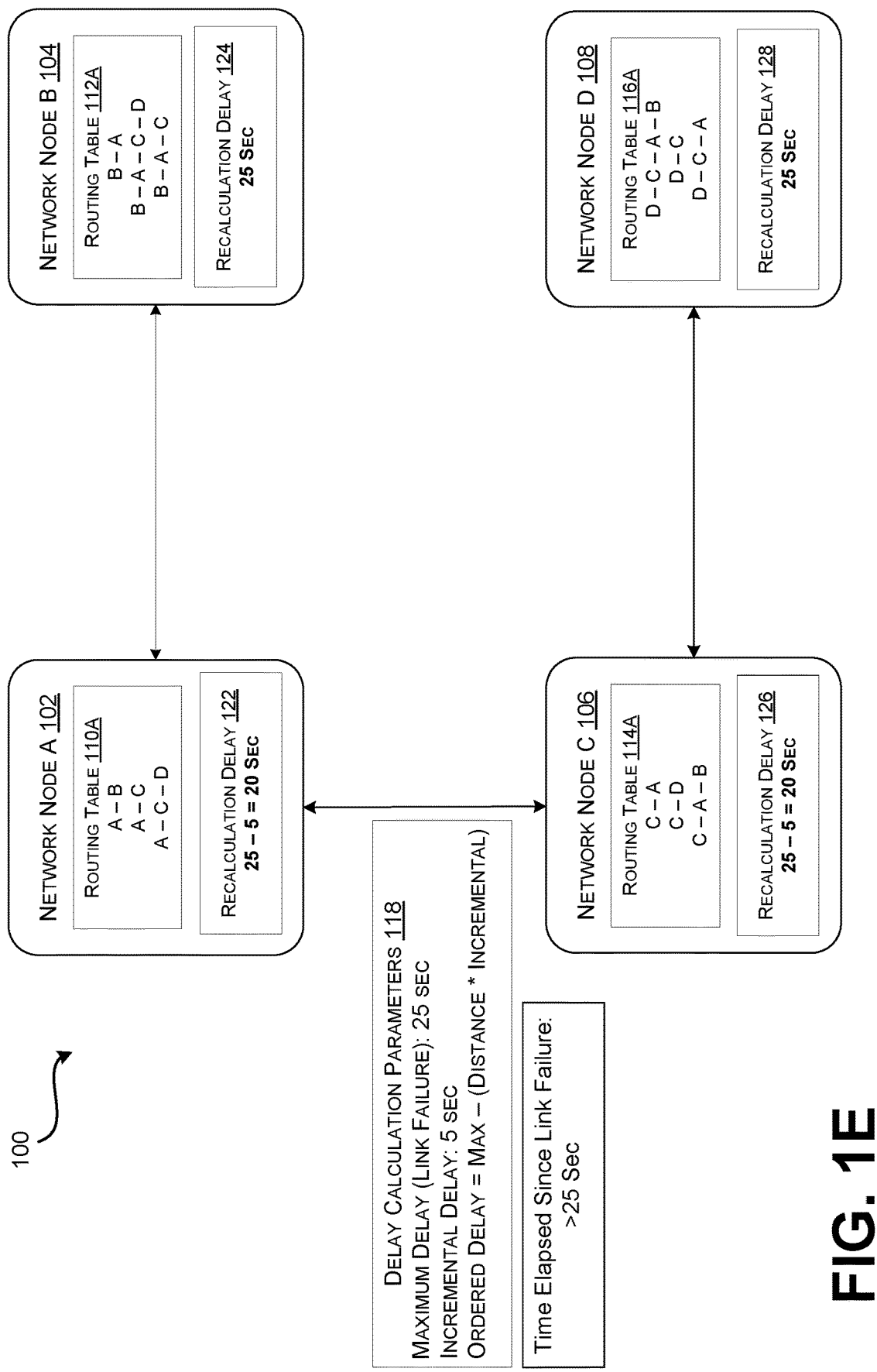
FIG. 1E illustrates aspects of an example network environment in a fourth state of a process of ordered reconvergence.

As shown in FIG. 1E, all nodes 102-104 have updated their respective routing tables 110A-116A in the order dictated by their ordered delays 122-128. As described above, the ordered delays are calculated using existing distance results. In this way, the system does not need to recalculate distances to enabled ordered reconvergence thereby reducing processing time. As such, the system can effectively prevent micro-loop formation through ordered reconvergence without incurring the costly computation of existing ordered reconvergence solutions. For instance, had the nodes of network environment 100 reconverged in an unordered manner, node B 104 may have updated its routing table 112 before node A 102 updated its routing table 110. In such a situation node B 104 would then begin routing data to node A 102 in accordance with its updated routing table 112A. Node A 102 would subsequently route data back to node B 104 since it is still referring to an outdated routing table 110 causing a micro-loop and thus lost data.

Figure 2A:
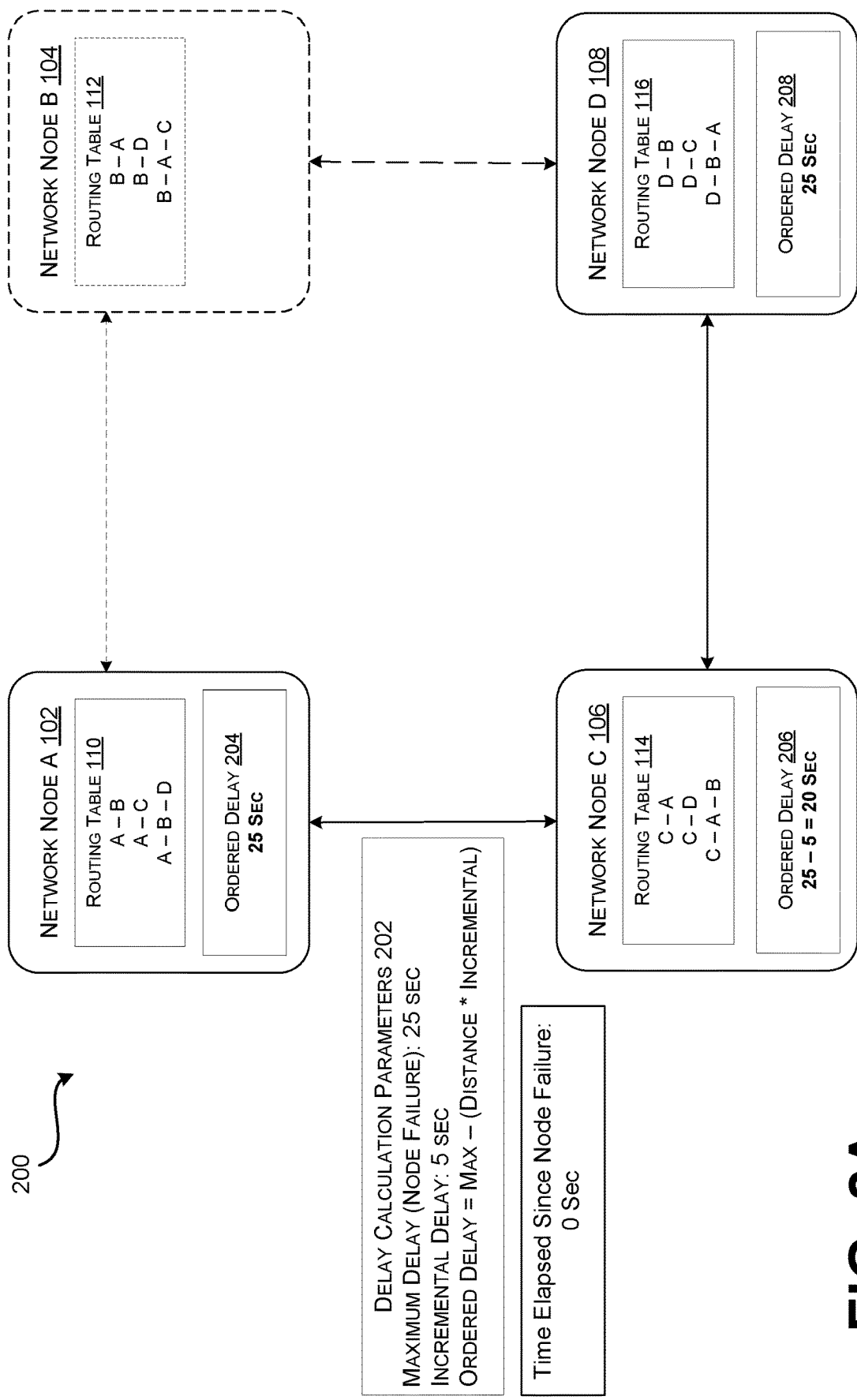
FIG. 2A illustrates aspects of a second example network environment in a first state of a process of ordered reconvergence.

Turning now to FIG. 2A, a second example network environment 200 is illustrated and described. In this example, network node B 104 has suffered a malfunction, is undergoing maintenance, or has otherwise gone offline. Accordingly, the remaining network nodes A 102, C 106, and D 108 determine their respective ordered delays based on their distance from node B 104 as described in the examples shown in FIG. 1A-FIG. 1E. In addition, the delay calculation parameters 202 can include parameters that are specific for a certain situation. In this instance, the parameters 202 include a maximum delay that is specific to a node failure event. It should be understood that while the illustrated values for the maximum and incremental delays are the same as those shown in FIGS. 1A-1E, these are merely illustrative and that these values can be modified automatically or manually to suit various situations across various communications networks. For example, a node failure event may require a different maximum delay from a link failure. In addition, since a node failure situation represents a similar change in topology as a link failure, ordered delays are calculated in a similar manner by subtracting a product of the distance and incremental delay from the max delay.

In a similar manner to the examples of FIGS. 1A-1E, nodes nearest the change in topology (e.g., the failed node) are assigned the maximum delay to allow more distant nodes to update their routing tables. In this example, node A 102 and node D 108 have a direct connection to node B 104 which has gone offline. Accordingly, node A 102 and node D 108 have the maximum ordered delay and node C 106 calculates a 20 second ordered delay due to its one hop distance from node B 104.

Figure 2B:
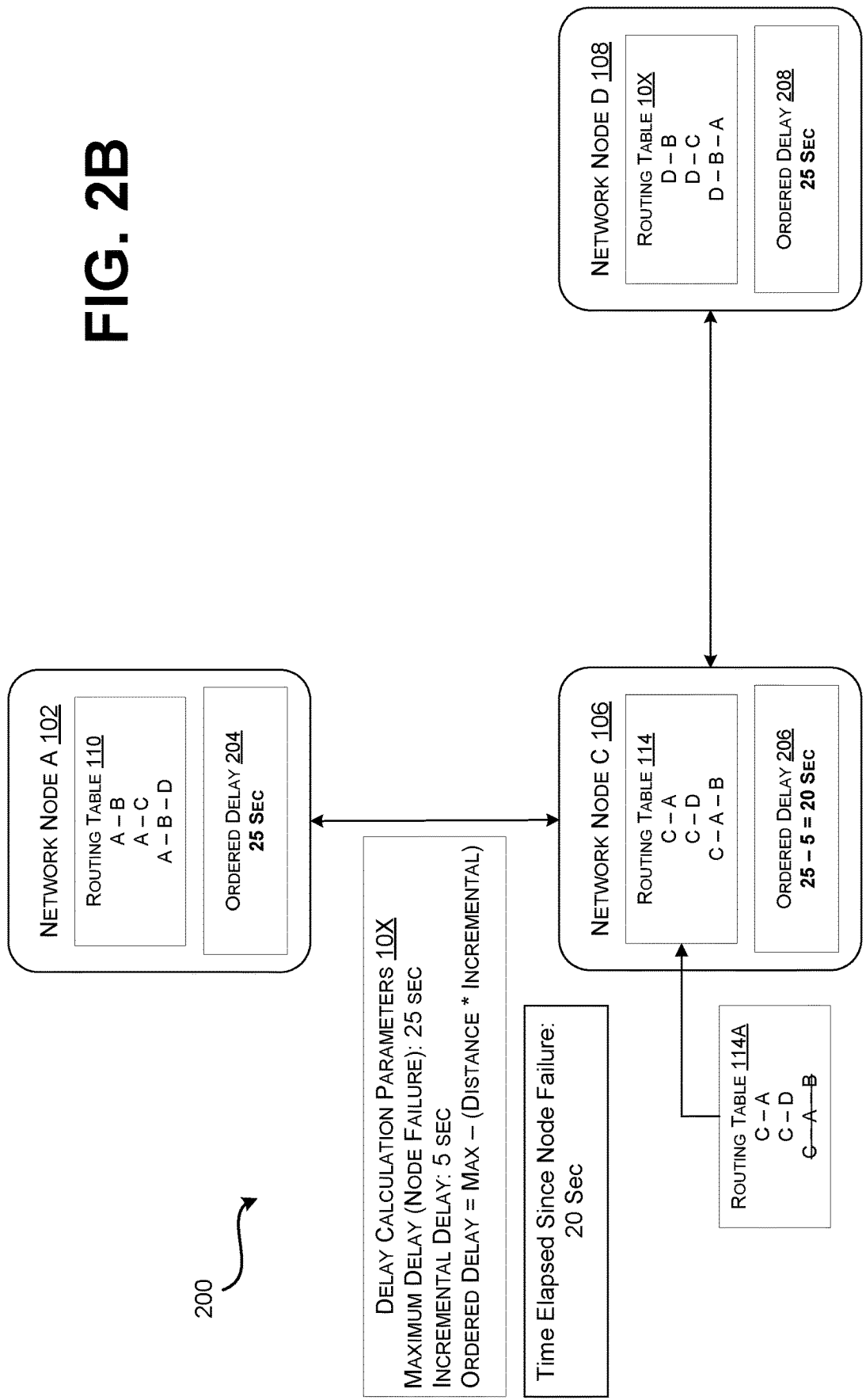
FIG. 2B illustrates aspects of a second example network environment in a second state of a process of ordered reconvergence.

Proceeding to FIG. 2B, twenty seconds has elapsed since node B 104 went offline. Thus, node C 106 can detect that its ordered delay has expired and can proceed to replace its routing table 114 with routing table 114A. In this example, node C 106 detects that node B 104 is not online and omits routes to node B from routing table 114A. It should be understood that while the illustrated example involves removing a route from the routing table 114A, routing tables can be updated in any way. For instance, existing routes can be modified or removed, new routes can be added to the routing table and so forth.

Proceeding to FIG. 2C, twenty-five seconds have now elapsed since the failure at node B 104 occurred. At this time, node A 102 and node D 108 can detect that their associated ordered delays have expired and thus proceed to update their routing tables 110 and 116 respectively. Just as with node C 106, node A 102 and node D 108 can detect that node B 104 cannot be reached and thus remove routes to node B 104 from routing tables 110A and 116A. In addition, node D 108 modifies its route to node A 102 to traverse node C 106 rather than node B 104. It should be understood that the nodes can receive information regarding the network 200 in many different ways. For example, link states can be advertised by individual nodes to neighboring nodes to construct routes. In another example, network information can be collected and disseminated by networks protocols that oversee the network as a whole.

Figure 2D:
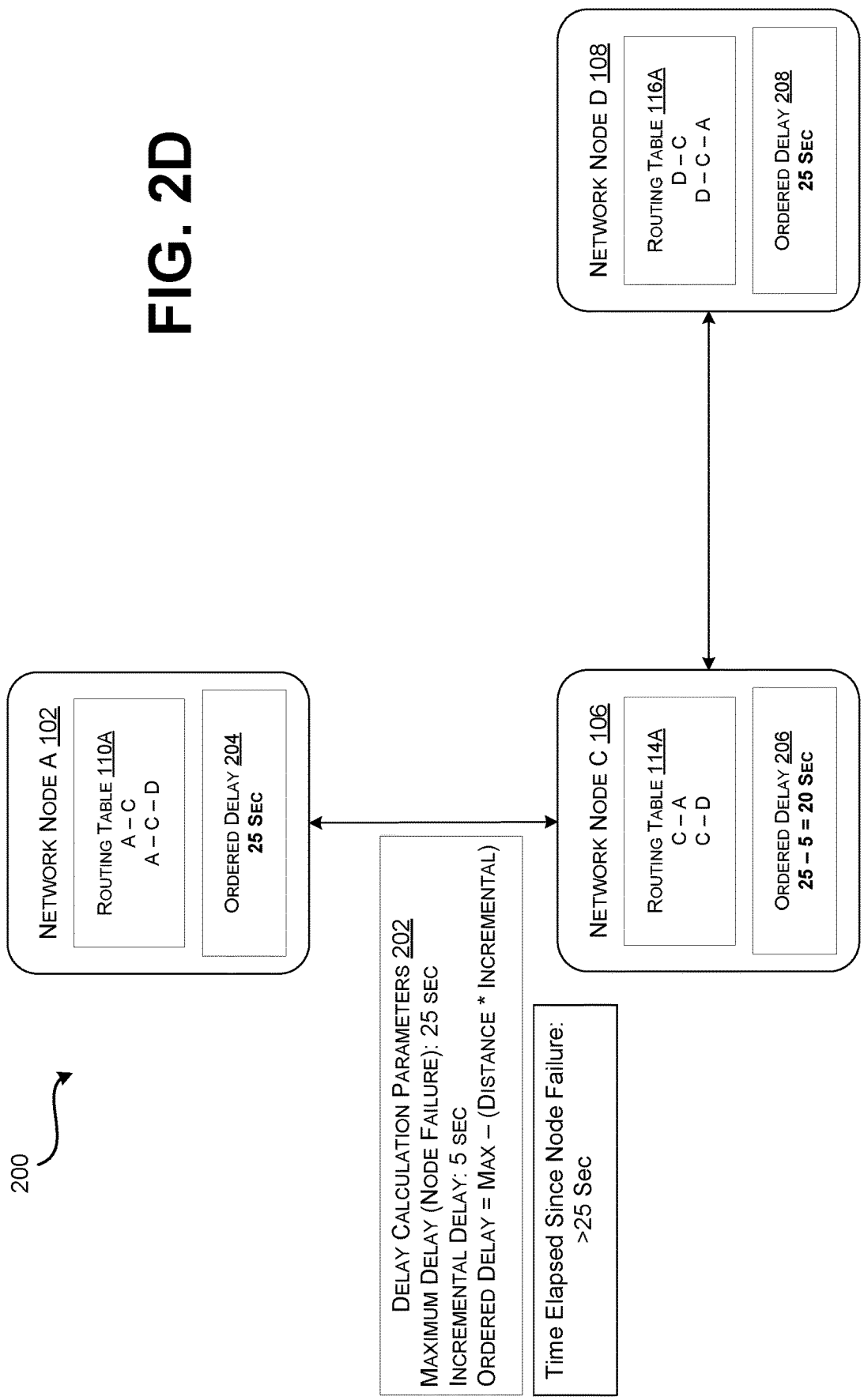
FIG. 2D illustrates aspects of a second example network environment in a fourth state of a process of ordered reconvergence.

Finally, as shown in FIG. 2D, nodes A 102, C 106, and D 108 have finished reconverging following the failure of node B 102. At this time, the network 200 has returned to an operational steady state. Using the values and equations defined in the delay calculation parameters 202 and readily available distance values as previously measured by a network protocol, the nodes can quickly calculate ordered delays. As discussed above, using existing distance values to calculate ordered delays enables the network 200 to effectively prevent micro-loops through ordered reconvergence while also reducing processing time compared to existing solutions. Thus, the network can more quickly return to steady state and minimize disruptions to service.

Figure 3A:
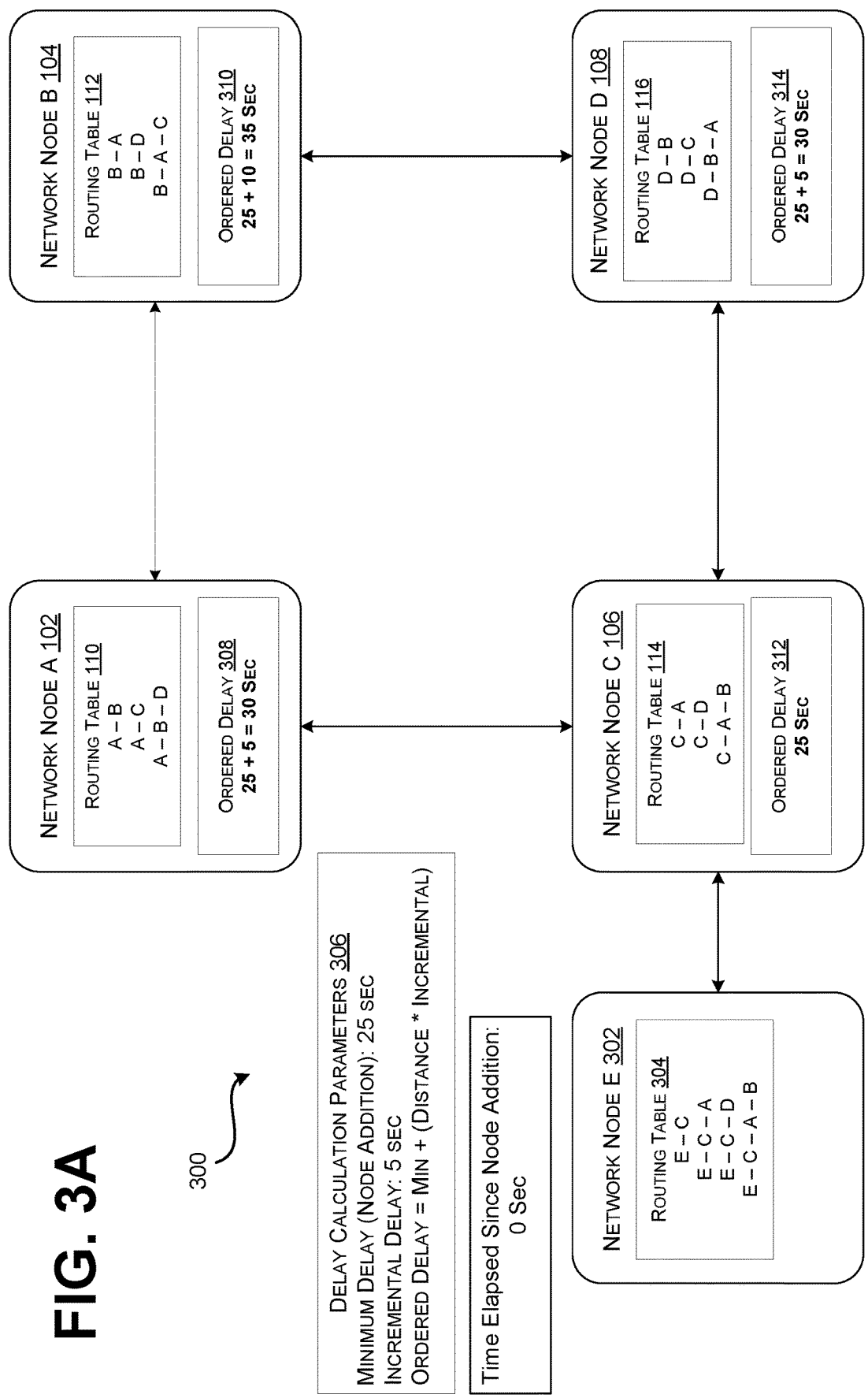
FIG. 3A illustrates aspects of a third example network environment in a first state of a process of ordered reconvergence.

Turning now to FIG. 3A, a third example network environment 300 is shown and described. In this example a new network node E 302 is added to the network 300. Like other nodes of the network, node E 302 is configured with a routing table 304. Since a node addition represents a different change in network topology compared to a link failure or a node failure, new delay calculation parameters 306 are selected for this example. For instance, ordered delays may now calculated using the following equation:

OrderedDelay=MinDelay+
(Distance*IncrementalDelay)

In this node addition example, the more distant a node is from the change in topology, the greater the delay should be. This is to allow nodes closer to the new node to update their routing tables to accommodate the new node first thereby preventing micro-loop formation. Consider a scenario in which node B 104 updates its routing table 112 before node A 102 updates its routing table 110. Node B 104 may subsequently attempt to route data to node E 302 through node A 102. Node A 102, upon receiving data intended for a node it has no information about, may simply route the data back to node B 104 thus causing a micro-loop and data loss. Thus, to allow the nodes of network environment 300 to reconverge in order and prevent micro-loops, a minimum ordered delay must be assigned to the node nearest the new node and increased as a function of distance from the new node.

As with the examples discussed above in FIGS. 1A-2D, MinDelay and IncrementalDelay are set values defined in the delay calculation parameters 306. MinDelay and IncrementalDelay can be automatically set by the system (e.g., from analysis by a network protocol) or manually set such as by a system engineer. In addition, minimum and incremental delays can be selected to suit different situations. For instance, the minimum delay for a node addition event can be specific to that event and may be changed for a new link coming online. It should be understood that while delays are discussed using specific values, they are merely illustrative and can be modified for various network environments and applications. As with the earlier examples, (Distance*IncrementalDelay) can be referred to as to local delay.

Similarly, using the values and equation discussed above, nodes A-D 102-108 can each calculate or otherwise receive an ordered delay 308-314 to enable ordered reconvergence. In this example, ordered delays 302-308 increase in duration the further away a particular node is from the new node E 302. Ordering nodes in this way allows those nodes nearest the new node to update their respective routing tables first and prevent micro-loops and thus data loss. It should be understood that while node E 302 in this illustrated example is not assigned an ordered delay, a system engineer or other administrative entity can choose to assign an ordered delay to node E 302 based on network conditions, applications utilizing the network and the like. As described above, the ordered delays 308-314 are calculated using known distance values measured by a network protocol prior to the change in network topology (e.g., during initialization of the network 300). In this way, the system eliminates the need for additional calculation when assigning ordered delays to individual nodes 102-108 thus reducing processing time and risk of error.

Thus, node C 106, having a direct connection to new node E 302 receives the minimum delay of twenty-five seconds. Node A 102 and node D 108 receive ordered delays of thirty seconds since they are one hop away from node E 302, one instance of the incremental delay of five seconds is added to the twenty-five second minimum delay. Finally, node B 104, being two hops away from node E 302 receives two instances of the incremental delay resulting in a thirty-five second ordered delay.

Figure 3B:
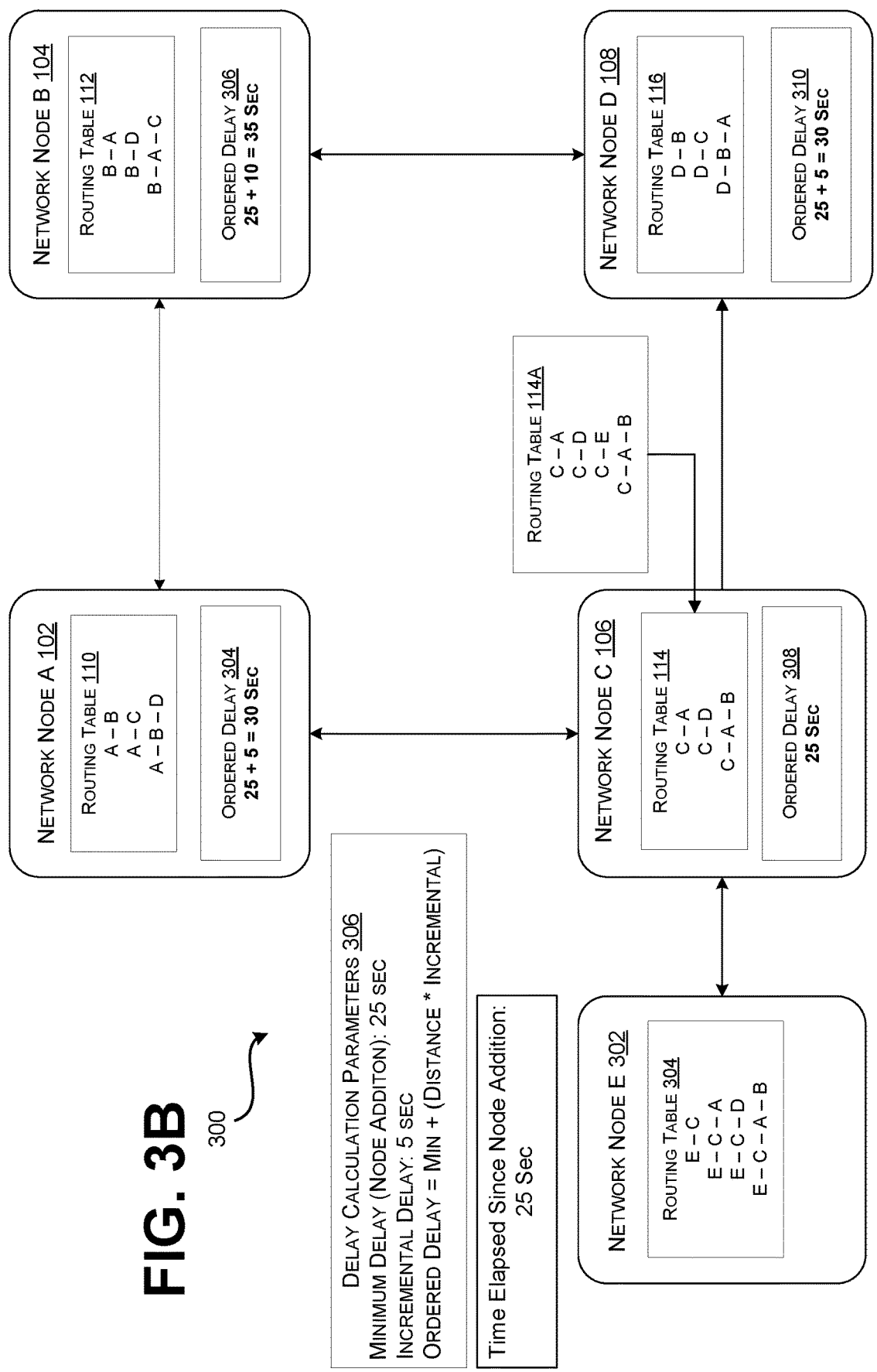
FIG. 3B illustrates aspects of a third example network environment in a second state of a process of ordered reconvergence.

Proceeding to FIG. 3B, twenty-five seconds has elapsed since node E 302 was added to the network 300. Thus, node C 106 can detect that its ordered delay 308 has expired and can begin updating its associated routing table 114. As discussed above, updating routing tables can include modifying, removing, or adding routes to the table. In this example, node C 106 updates routing table 114 by adding a new route linking node C 106 to node E 302 in routing table 114A. It should be appreciated that while the examples illustrated herein involve a single type of routing table update (e.g., modifying a route, removing a route, adding a route, etc.), the disclosed techniques can perform any combination of routing table updates to address various changes to network topology.

Figure 3C:
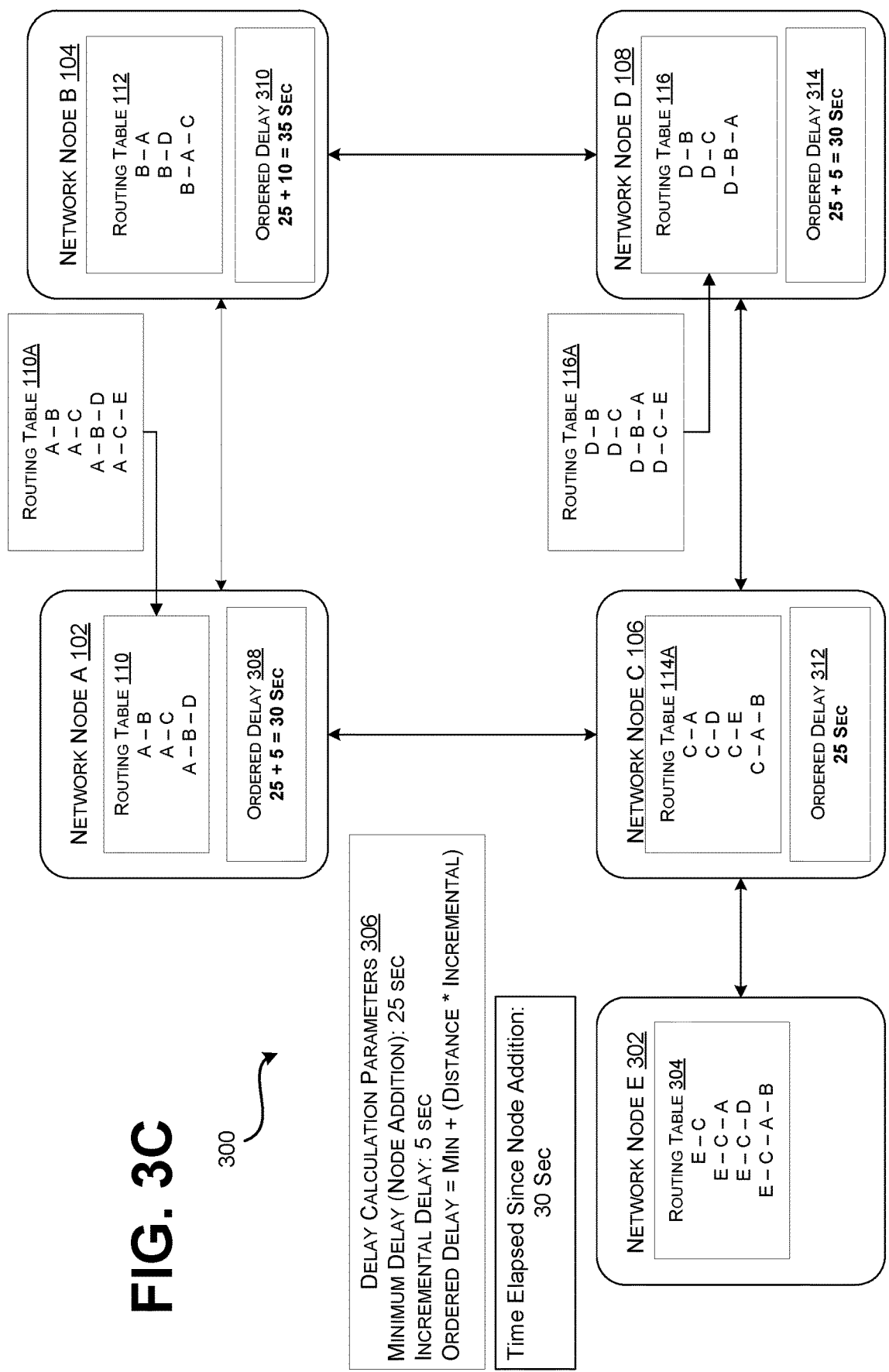
FIG. 3C illustrates aspects of a third example network environment in a third state of a process of ordered reconvergence.

Turning now to FIG. 3C, thirty seconds have passed since network node E 302 was added to the network 300. At this time, node A 102 and node D 108 can detect that their ordered delays 308 and 314 have passed and begin updating their routing tables 110 and 116, respectively. As with node C 106, node A 102 and node D 108 determine new routes to node E 302 and add them to routing tables 110A and 116A. Node A 102 and node D 108 can then replace routing tables 110 and 116 with updated routing tables 110A and 116A.

Figure 3D:
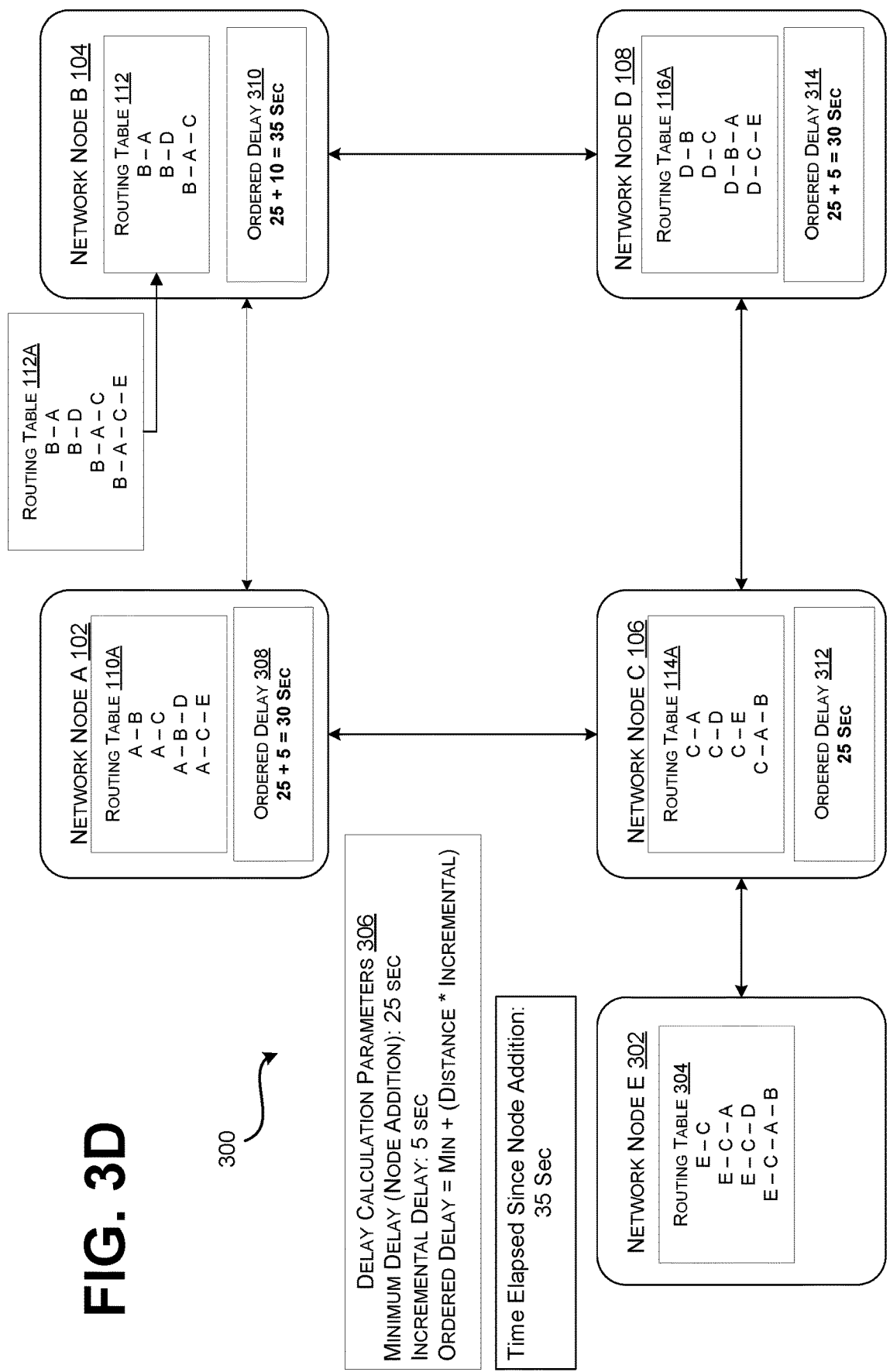
FIG. 3D illustrates aspects of a third example network environment in a fourth state of a process of ordered reconvergence.

Proceeding to FIG. 3D, thirty-five seconds have now elapsed and finally the ordered delay associated with node B 104 has expired. Node B 104 can thus begin generating a new routing table 112A including a new route to node E 302. In this example, node B 104 routes data through node A 102 and node C 106 to reach node E 302. However, it should be appreciated that the routes shown in FIG. 3D are arbitrary and merely illustrative. In practice, routes through a communications network can be determined using any of a variety of techniques such as distance vector algorithms, link-state algorithms, and the like.

Turning lastly to FIG. 3E, more than 35 seconds have passed since node E 302 was added to the network 300. At this point in time, all the nodes 102-108 have finished updating their respective routing tables 110-116 and can now begin routing traffic through the network with updated routing tables 110A-116A. Thus, the network 300 can quickly return to operational steady state while preventing micro-loop formation and data loss through ordered reconvergence. By using known distance data to calculate ordered delays, the system can bypass the complexities and inefficiencies of existing ordered reconvergence solutions. Stated another way, the disclosed techniques provide a more computationally simple and efficient solution that still effectively prevents micro-loop formation.

Figure 4:
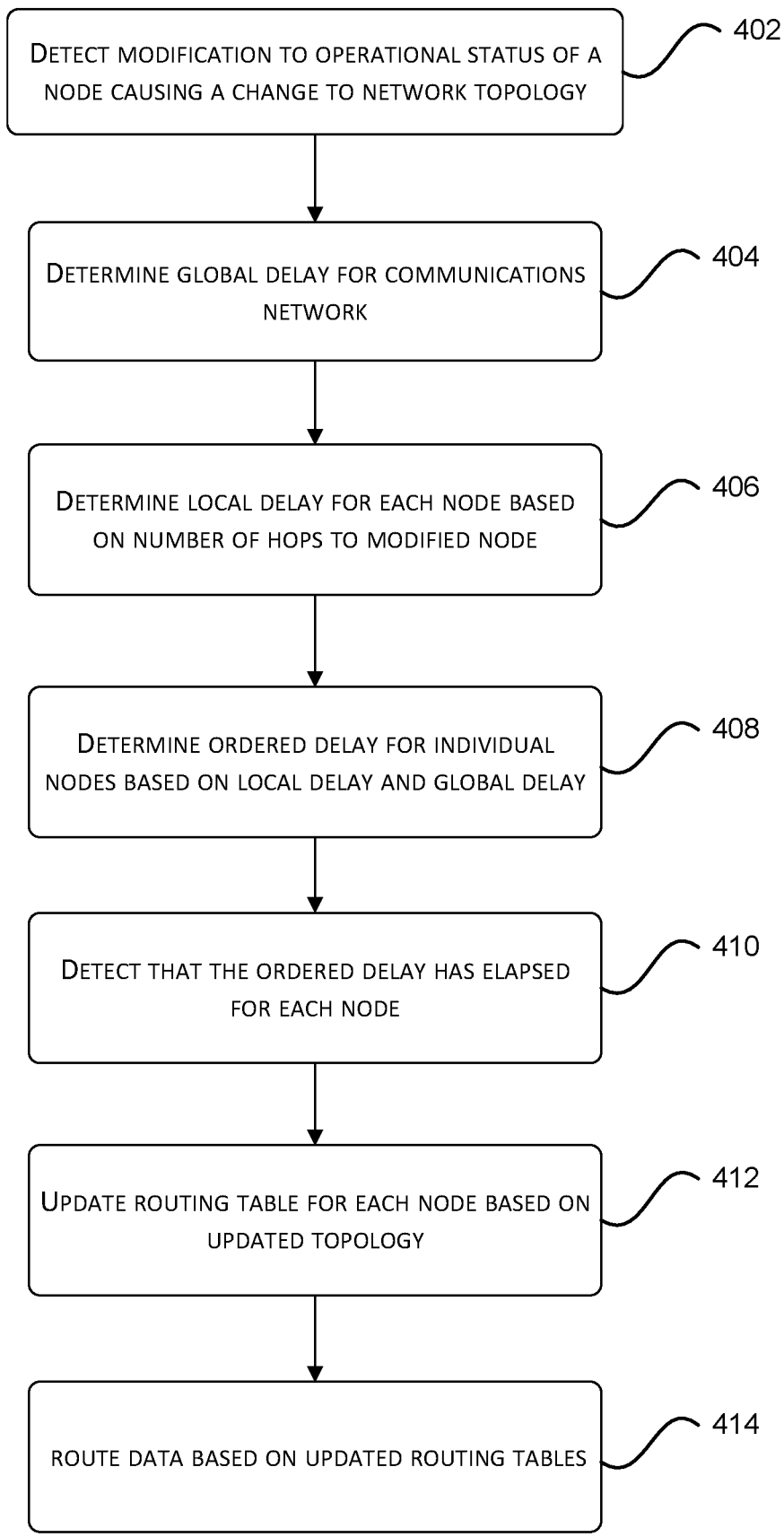
FIG. 4 is a flow diagram showing aspects of a routine for enabling ordered reconvergence features

Turning now to FIG. 4, aspects of a routine 400 for performing ordered reconvergence to prevent micro-loop formation following a change in network topology are shown and described below. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 400 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 400 may be also implemented in many other ways. For example, the routine 400 may be implemented, at least in part, by a processor of another remote computer or a local circuit. In addition, one or more of the operations of the routine 400 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 4, the routine 400 begins at operation 402 where a system detects a modification to an operational status of a node within the communications network that results in an updated network topology. For instance, a link failure or a node failure can cause a node to go offline and change the network topology.

Proceeding to operation 404, the system responds to the changed topology by determining a global delay to begin calculating ordered delays for each of the nodes within the communications network. The global delay can be the maximum delay shown in the examples of FIGS. 1A-1E and FIGS. 2A-2D. Alternatively, the global delay can the minimum delay shown in the examples of FIGS. 3A-3E. In various examples, the global delay can be a predetermined value that is configured by a system engineer or other administrative entity. The global delay can also be automatically configured by the system based on an analysis by a network protocol.

Next at operation 406, each node of the communications network is assigned a local delay, which is the product of the distance between a particular node and the modified node (e.g., where the topology change occurred) and an incremental delay. As described above, distance within a network can be expressed in terms of hops (e.g., the number of nodes to traverse to a destination). As with the global delay, the incremental delay can be manually or automatically configured and adjusted for various scenarios.

Proceeding to operation 408, the system then determines an ordered delay for each node based on the local delay and global delay. For instance, in some of the examples described above, the ordered delay can be a difference of the global delay and the local delay. In other examples, the ordered delay can be a sum of the global delay and the local delay. The ordered delay can be calculated in many other ways using the global delay and local delay.

At operation 410, the system can detect, for each node, that its corresponding ordered delay has elapsed. This operation is performed on a per node basis as each node within the communications network may have a different ordered delay.

After detecting that an ordered delay for a node has expired, the system can proceed to operation 412 where the system updates routing tables for each node using the updated network topology. As discussed, updating the routing tables can include one of or a combination of modifying existing routes, removing routes, and adding new routes.

Finally, at operation 414, the system can route data throughout the communications network using the updated routing tables.

Figure 5:
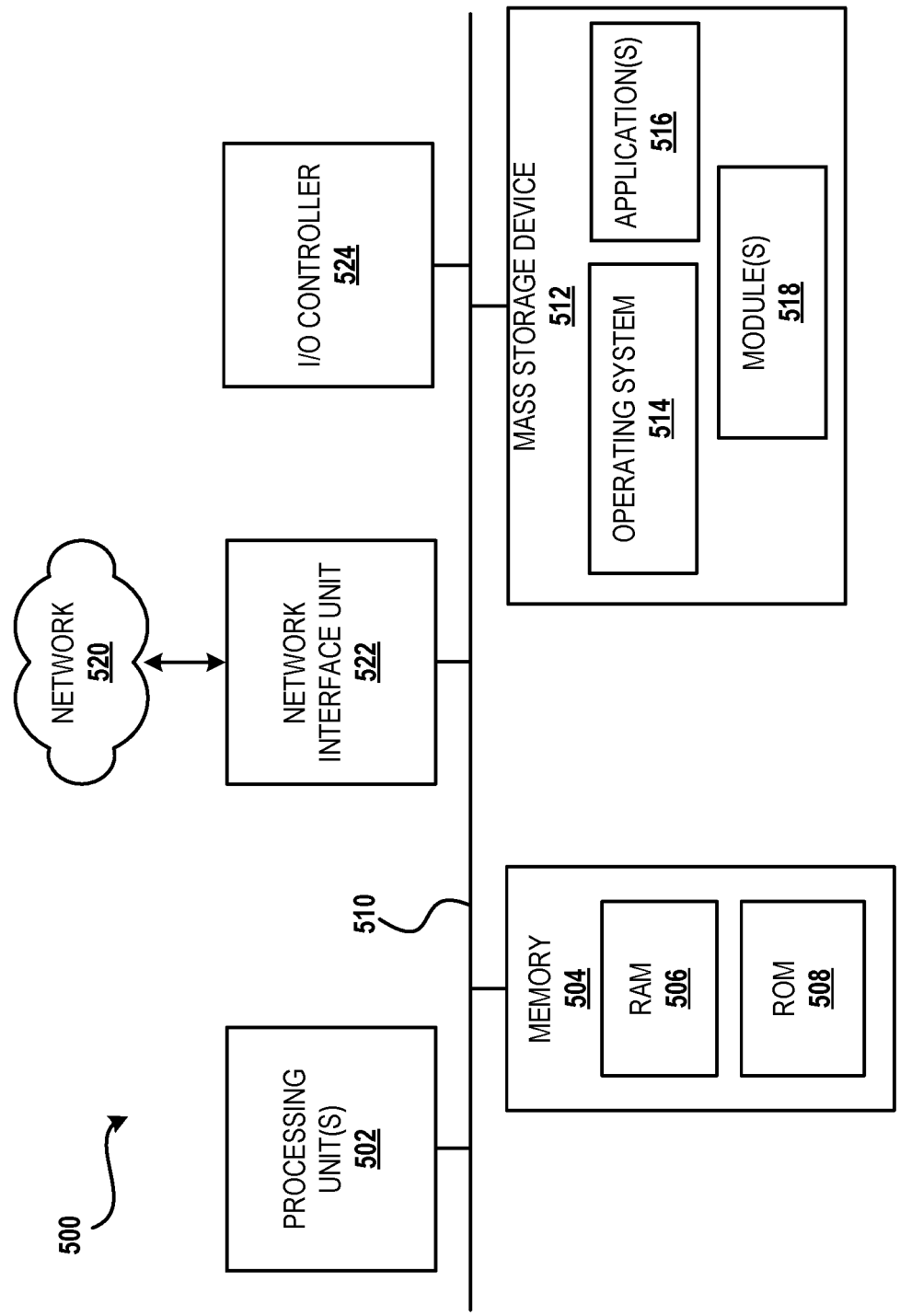
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a computer, capable of executing the program components described herein. Thus, the computer architecture 500 illustrated in FIG. 5 illustrates an architecture for a server computer, a mobile phone, a PDA, a smart phone, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random-access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing an operating system 514, one or more applications 516, and one or more modules 518.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media or a computer storage medium may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information, and which can be accessed by the computer architecture 500. For purposes of the claims, the phrase "non-transitory computer storage medium," "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 520 and/or another network (not shown). The computer architecture 500 may connect to the network 520 through a network interface unit 522 connected to the bus 510. It should be appreciated that the network interface unit 522 also may be utilized to connect to other types of networks and remote computer systems. The computer architecture 500 also may include an input/output controller 524 for receiving and processing input from a number of other devices, including a keyboard, mouse, or electronic stylus (not shown in FIG. 5). Similarly, the input/output controller 524 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Figure 6:
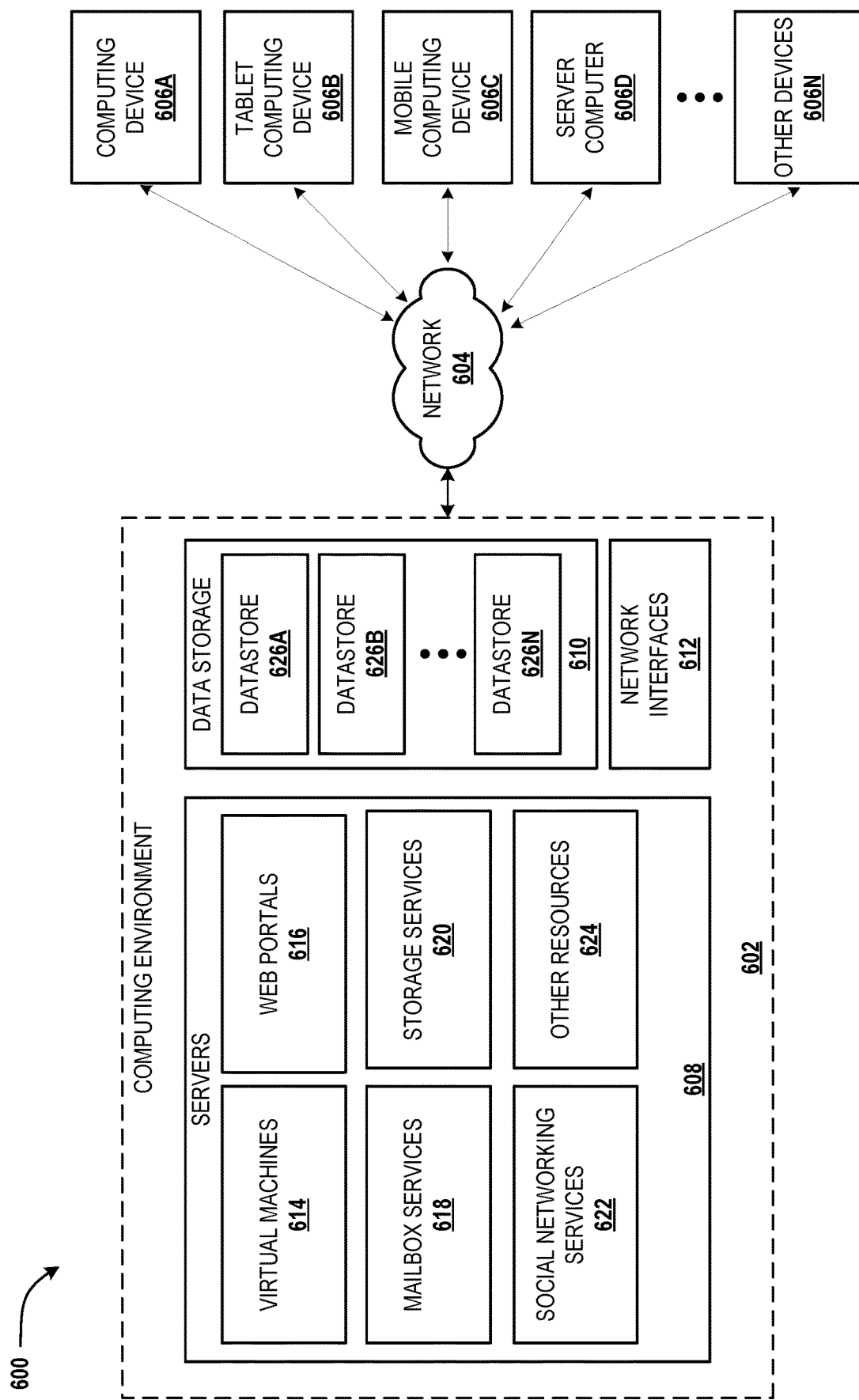
FIG. 6 is a diagram illustrating a distributed computing environment capable of implementing aspects of the techniques and technologies presented herein.

FIG. 6 depicts an illustrative distributed computing environment 600 capable of executing the software components described herein. Thus, the distributed computing environment 600 illustrated in FIG. 6 can be utilized to execute any aspects of the software components presented herein. For example, the distributed computing environment 600 can be utilized to execute aspects of the software components described herein.

Accordingly, the distributed computing environment 600 can include a computing environment 602 operating on, in communication with, or as part of the network 604. The network 604 can include various access networks. One or more client devices 606A-606N (hereinafter referred to collectively and/or generically as "clients 606" and also referred to herein as computing devices 606) can communicate with the computing environment 602 via the network 604. In one illustrated configuration, the clients 606 include a computing device 606A such as a laptop computer, a desktop computer, or other computing device; a slate or tablet computing device ("tablet computing device") 606B; a mobile computing device 606C such as a mobile telephone, a smart phone, or other mobile computing device; a server computer 606D; and/or other devices 606N. It should be understood that any number of clients 606 can communicate with the computing environment 602.

In various examples, the computing environment 602 includes servers 608, data storage 610, and one or more network interfaces 612. The servers 608 can host various services, virtual machines, portals, and/or other resources. In the illustrated configuration, the servers 608 host virtual machines 614, Web portals 616, mailbox services 618, storage services 620, and/or, social networking services 622. As shown in FIG. 6 the servers 608 also can host other services, applications, portals, and/or other resources ("other resources") 624.

As mentioned above, the computing environment 602 can include the data storage 610. According to various implementations, the functionality of the data storage 610 is provided by one or more databases operating on, or in communication with, the network 604. The functionality of the data storage 610 also can be provided by one or more servers configured to host data for the computing environment 602. The data storage 610 can include, host, or provide one or more real or virtual datastores 626A-626N (hereinafter referred to collectively and/or generically as "datastores 626"). The datastores 626 are configured to host data used or created by the servers 608 and/or other data. That is, the datastores 626 also can host or store web page documents, word documents, presentation documents, data structures, algorithms for execution by a recommendation engine, and/or other data utilized by any application program. Aspects of the datastores 1026 may be associated with a service for storing files.

The computing environment 602 can communicate with, or be accessed by, the network interfaces 612. The network interfaces 612 can include various types of network hardware and software for supporting communications between two or more computing devices including, but not limited to, the computing devices and the servers. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 600 to utilize the functionality described herein for providing the techniques disclosed herein, among other aspects.

The disclosure presented herein also encompasses the subject matter set forth in the following clauses:

Clause 1: A method for updating routing information in a communications network having a plurality of nodes, the routing information being updated in response to a modification to an operational status of a node in the communications network resulting in an updated network topology, wherein the routing information is to be updated in an ordered sequence by the nodes to avoid micro-loops, the method comprising:

determining a global delay of the communications network based on a maximum number of hops in the communications network;

for each of the nodes of the communications network, determining a local delay relative to the modified node, the local delay based on multiplying an incremental delay by a pre-calculated number of hops between the respective node and the modified node;

determining an ordered delay for each of the nodes of the communications network based on the local delay and the global delay, the ordered delay indicative of a time period to be elapsed before a node of the plurality of nodes updates its routing table;

at each of the nodes:

determining, that the respective ordered delay has elapsed;

in response to determining that the respective ordered delay has elapsed, updating a routing table for the respective node based on the updated network topology; and routing data in the updated network topology using the updated routing tables.

Clause 2: The method of clause 1, wherein the global delay is a predetermined value p.

Clause 3: The method of any of clauses 1-2, wherein the global delay is determined based on an analysis of the communications network by a network protocol.

Clause 4: The method of any of clauses 1-3, wherein the incremental delay is determined so as to minimize a time of updating the routing tables.

Clause 5: The method of any of clauses 1-4, wherein the number of hops to the modified node comprises a distance determined from an analysis of the communications network performed by a network protocol.

Clause 6: The method of any of clauses 1-5, wherein the modification to the operational status comprises a node failure or a link failure, and wherein the ordered delay is determined by subtracting the local delay from the global delay.

Clause 7: The method of clauses 1-6, wherein the modification to the operation status comprises an addition of a node to the communications network, and wherein the global delay is updated based on the additional node.

Clause 8: The method of any of clauses 1-7, wherein a routing table for the added node is calculated concurrently with the addition of the node.

Clause 9: A method for updating routing information at a node of a communications network having a plurality of nodes, the routing information being updated in response to a modification to an operational status of a node in the communications network resulting in an updated network topology, wherein the routing information is to be updated in an ordered sequence by the nodes to avoid micro-loops, the method comprising:

receiving an indication of a modification to the communications network resulting in the updated network topology;

responsive to the indication of the modification:

accessing a global delay of the communications network, the global delay determined using a protocol for administrating routing operations of the communications network, the global delay based on a maximum number of hops in the communications network;

determining a local delay relative to the modified node, the local delay based on multiplying an incremental delay by a pre-calculated number of hops between the respective node and the modified node, the pre-calculated number of hops determined using the protocol;

determining an ordered delay for the node by subtracting the local delay from the global delay, the ordered delay indicative of a time period to be elapsed before the node updates its routing table;

determining that the ordered delay has elapsed;

in response to determining that the ordered delay has elapsed, updating the routing table for the node using the updated network topology; and routing data at the node using the updated routing table.

Clause 10: The system of clause 9, wherein the global delay is a predetermined value and is determined based on an analysis of the communications network by the protocol.

Clause 11: The system of any of clauses 9 and 10, wherein the incremental delay is determined so as to minimize an execution time of updating the routing table.

Clause 12: The system of any clauses 9-11, wherein the number of hops to the modified node comprises a distance determined based on an analysis of the communications network by the protocol.

Clause 13: The system of any clauses 9-12, wherein the modification comprises a node failure or a link failure, and wherein the ordered delay is determined by subtracting the local delay from the global delay.

Clause 14: The system of any clauses 9-13, wherein the modification comprises an addition of a node to the communications network, and wherein the global delay is updated based on the additional node.

Clause 15: The system of any clauses 9-14, wherein a routing table for the added node is calculated concurrently with the addition of the node.

Clause 16: A communications network comprising:
a plurality of nodes;
one or more processing units; and
a computer-readable medium having encoded thereon computer-readable instructions to cause the one or more processing units to:
in response to a modification to an operational status of one of the nodes in the communications network resulting in an updated network topology:
determine a global delay of the communications network based on a maximum number of hops in the communications network;
determine a local delay for each of the plurality of nodes based on a pre-calculated number of hops to the modified node multiplied by an incremental delay;
determine an ordered delay for each of the plurality of nodes based on the local delay and the global delay;
for each of the plurality of nodes, in response to determining that the respective ordered delay has elapsed, update a routing table for the respective node using the updated network topology; and
route data based on the updated routing tables.

Clause 17: The communications network of clause 16, wherein the number of hops to the modified node comprises a distance determined based on an analysis of the communications network by a network protocol.

Clause 18: The communications network of any of clauses 16 and 17, wherein the modification to the operational status comprises a node failure or a link failure, and wherein the ordered delay is determined by subtracting the local delay from the global delay.

Clause 19: The communications network of any of the clauses 16-18, wherein the modification to the operation status comprises an addition of a node to the communications network, and wherein the global delay is updated based on the additional node.

Clause 20: The communications network of any of the clauses 16-19, wherein a routing table for the added node is calculated concurrently with the addition of the node.

What is claimed is:

1. A method for updating routing information in a communications network having a plurality of nodes, the routing information being updated in response to a modification to an operational status of a node in the communications network resulting in an updated network topology, wherein the routing information is to be updated in an ordered sequence by the nodes to avoid micro-loops, the method comprising:
determining a global delay of the communications network based on a maximum number of hops in the communications network;
for each of the nodes of the communications network, determining a local delay relative to the modified node, the local delay based on multiplying an incremental delay by a pre-calculated number of hops between the respective node and the modified node;
determining an ordered delay for each of the nodes of the communications network based on the local delay and the global delay, the ordered delay indicative of a time period to be elapsed before a node of the plurality of nodes updates its routing table;
at each of the nodes:
determining, that the respective ordered delay has elapsed;
in response to determining that the respective ordered delay has elapsed, updating a routing table for the respective node based on the updated network topology; and
routing data in the updated network topology using the updated routing tables.

2. The method of claim 1, wherein the global delay is a predetermined value.

3. The method of claim 2, wherein the global delay is determined based on an analysis of the communications network by a network protocol.

4. The method of claim 1, wherein the incremental delay is determined so as to minimize a time of updating the routing tables.

5. The method of claim 1, wherein the number of hops to the modified node comprises a distance determined from an analysis of the communications network performed by a network protocol.

6. The method of claim 1, wherein the modification to the operational status comprises a node failure or a link failure, and wherein the ordered delay is determined by subtracting the local delay from the global delay.

7. The method of claim 1, wherein the modification to the operation status comprises an addition of a node to the communications network, and wherein the global delay is updated based on the additional node.

8. The method of claim 7, wherein a routing table for the added node is calculated concurrently with the addition of the node.

9. A method for updating routing information at a node of a communications network having a plurality of nodes, the routing information being updated in response to a modification to an operational status of a node in the communications network resulting in an updated network topology, wherein the routing information is to be updated in an ordered sequence by the nodes to avoid micro-loops, the method comprising:
receiving an indication of a modification to the communications network resulting in the updated network topology;
responsive to the indication of the modification:
accessing a global delay of the communications network, the global delay determined using a protocol for administrating routing operations of the communications network, the global delay based on a maximum number of hops in the communications network;
determining a local delay relative to the modified node, the local delay based on multiplying an incremental delay by a pre-calculated number of hops between the respective node and the modified node, the pre-calculated number of hops determined using the protocol;
determining an ordered delay for the node by subtracting the local delay from the global delay, the ordered delay indicative of a time period to be elapsed before the node updates its routing table;
determining that the ordered delay has elapsed;
in response to determining that the ordered delay has elapsed, updating the routing table for the node using the updated network topology; and
routing data at the node using the updated routing table.

10. The method of claim 9, wherein the global delay is a predetermined value and is determined based on an analysis of the communications network by the protocol.

11. The method of claim 9, wherein the incremental delay is determined so as to minimize an execution time of updating the routing table.

12. The method of claim 9, wherein the number of hops to the modified node comprises a distance determined based on an analysis of the communications network by the protocol.

13. The method of claim 9, wherein the modification comprises a node failure or a link failure, and wherein the ordered delay is determined by subtracting the local delay from the global delay.

14. The method of claim 9, wherein the modification comprises an addition of a node to the communications network, and wherein the global delay is updated based on the additional node.

15. The method of claim 14, wherein a routing table for the added node is calculated concurrently with the addition of the node.

16. A communications network comprising:
   a plurality of nodes;
   one or more processing units; and
   a computer-readable medium having encoded thereon computer-readable instructions to cause the one or more processing units to:
      in response to a modification to an operational status of one of the nodes in the communications network resulting in an updated network topology:
         determine a global delay of the communications network based on a maximum number of hops in the communications network;
         determine a local delay for each of the plurality of nodes based on a pre-calculated number of hops to the modified node multiplied by an incremental delay;
         determine an ordered delay for each of the plurality of nodes based on the local delay and the global delay;
         for each of the plurality of nodes, in response to determining that the respective ordered delay has elapsed, update a routing table for the respective node using the updated network topology; and
      route data based on the updated routing tables.

17. The communications network of claim 16, wherein the number of hops to the modified node comprises a distance determined based on an analysis of the communications network by a network protocol.

18. The communications network of claim 16, wherein the modification to the operational status comprises a node failure or a link failure, and wherein the ordered delay is determined by subtracting the local delay from the global delay.

19. The communications network of claim 16, wherein the modification to the operation status comprises an addition of a node to the communications network, and wherein the global delay is updated based on the additional node.

20. The communications network of claim 19, wherein a routing table for the added node is calculated concurrently with the addition of the node.

* * * * *